Figure 1:
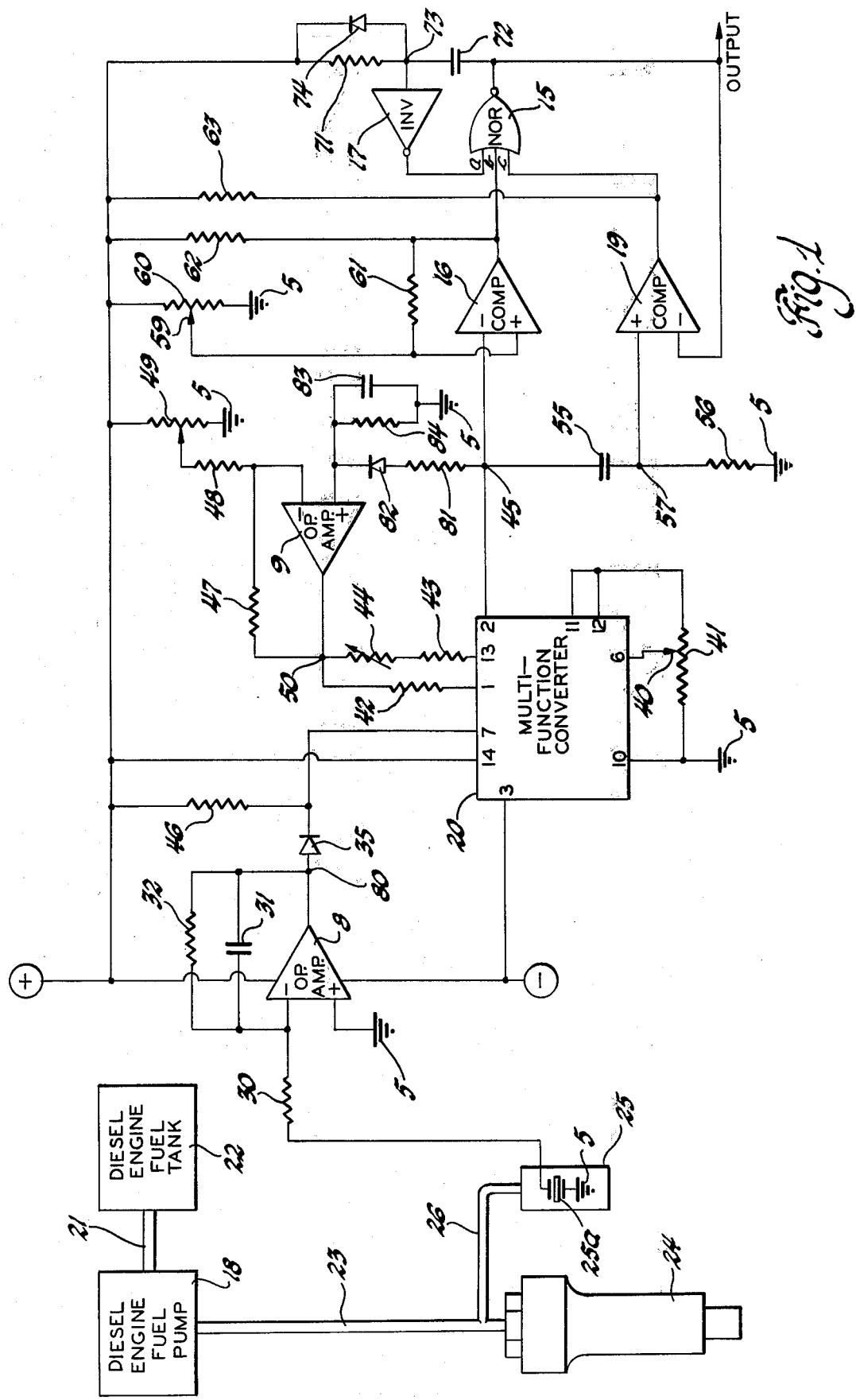

United States Patent [19]

Brandt

[11] 4,337,650
[45] Jul. 6, 1982

[54] DIESEL ENGINE START OF FUEL INJECTION DETECTING SYSTEM

[75] Inventor: Herman F. Brandt, Birmingham, Mich.

[73] Assignee: General Motors Corporation, Detroit, Mich.

[21] Appl. No.: 208,864

[22] Filed: Nov. 21, 1980

[51] Int. Cl.³ .......................................... G01M 15/00
[52] U.S. Cl. ................................................ 73/119 A
[58] Field of Search ....................... 73/119 A, 35, 168

[56] References Cited

U.S. PATENT DOCUMENTS 3,731,527 5/1973 Weaver .............................. 73/119 A
4,266,427 5/1981 Wesley .............................. 73/119 A Primary Examiner—Jerry W. Myracle
Attorney, Agent, or Firm—Richard G. Stahr

[57] ABSTRACT

An electrical pressure signal that varies directly in magnitude with changes of fuel line pressure at the fuel injector is raised to a selected mathematical power. This signal is then differentiated to detect the negative rate thereof that occurs at the point of inflection upon the start of fuel injection and a "start of fuel injection" output signal is produced in response to the detection of the point of inflection as indicated by the negative rate.

4 Claims, 2 Drawing Figures

DIESEL ENGINE START OF FUEL INJECTION DETECTING SYSTEM

This invention is directed to a system for detecting the start of fuel injection of a diesel engine and, more specifically, to a system of this type wherein a pressure signal proportional to fuel line pressure at the fuel injector is raised to a selected mathematical power and differentiated, and an output signal is produced upon a change of rate of the differentiated signal at the point of inflection of the pressure signal.

To properly time a diesel engine, it is necessary that the start of fuel injection be accurately determined as diesel engine timing is based upon this event. It is preferable that the base timing of a diesel engine be established within the order of plus or minus 0.5 degrees to realize optimum engine efficiency. It has been found that the injection of fuel in a diesel engine is a combined function of the instantaneous fuel pressure, cylinder pressure and the preload on the injector return spring. A study of the fuel pressure at the head of the fuel injector indicates basically four phases of operation of the fuel injection process, namely:

Phase 1: injection and compression of the fuel into the fuel line by the fuel pump prior to injection of the fuel into the cylinder;

Phase 2: release of the fuel pressure at the fuel injector and subsequent injection of the fuel into the cylinder;

Phase 3: stopping of the fuel flow from the fuel pump and subsequent closing of the injector; and Phase 4: water hammer effect in the fuel line while both ends thereof are checked off.

It is the inflection point or the point of beginning of a negative rate of the first major fuel line pressure increase that indicates that the fuel, which is being compressed in a dead-headed line, is being released into the cylinder. Accurate detection of the first major fuel line pressure increase peak pressure point or the inflection point thereof provides an accurate indication of the start or fuel injection in a diesel engine.

It is, therefore, an object of this invention to provide an improved system for accurately determining diesel engine start of fuel injection.

It is another object of this invention to provide an improved system for accurately determining diesel engine start of fuel injection wherein an electrical pressure signal that varies directly with fuel line pressure at the fuel injector is raised a selected mathematical power and an output signal produced at the inflection point of this signal upon the start of fuel injection.

It is another object of this invention to provide an improved system for accurately determining diesel engine start of fuel injection wherein an electrical pressure signal that varies directly with fuel line pressure at the fuel injector is raised to a selected mathematical power and differentiated, and an output signal is produced in response to a selected rate of change of this differentiated pressure signal at the inflection point of the pressure signal.

In accordance with this invention, a system for accurately determining diesel engine start of fuel injection is provided wherein an electrical pressure signal that varies directly in magnitude with changes of fuel line pressure at the fuel injector is raised to a selected mathematical power and differentiated, and an output signal is produced in response to a rate of change of this differentiated pressure signal at the inflection point of fuel pressure signal that occurs upon the start of fuel injection.

Figure 2:
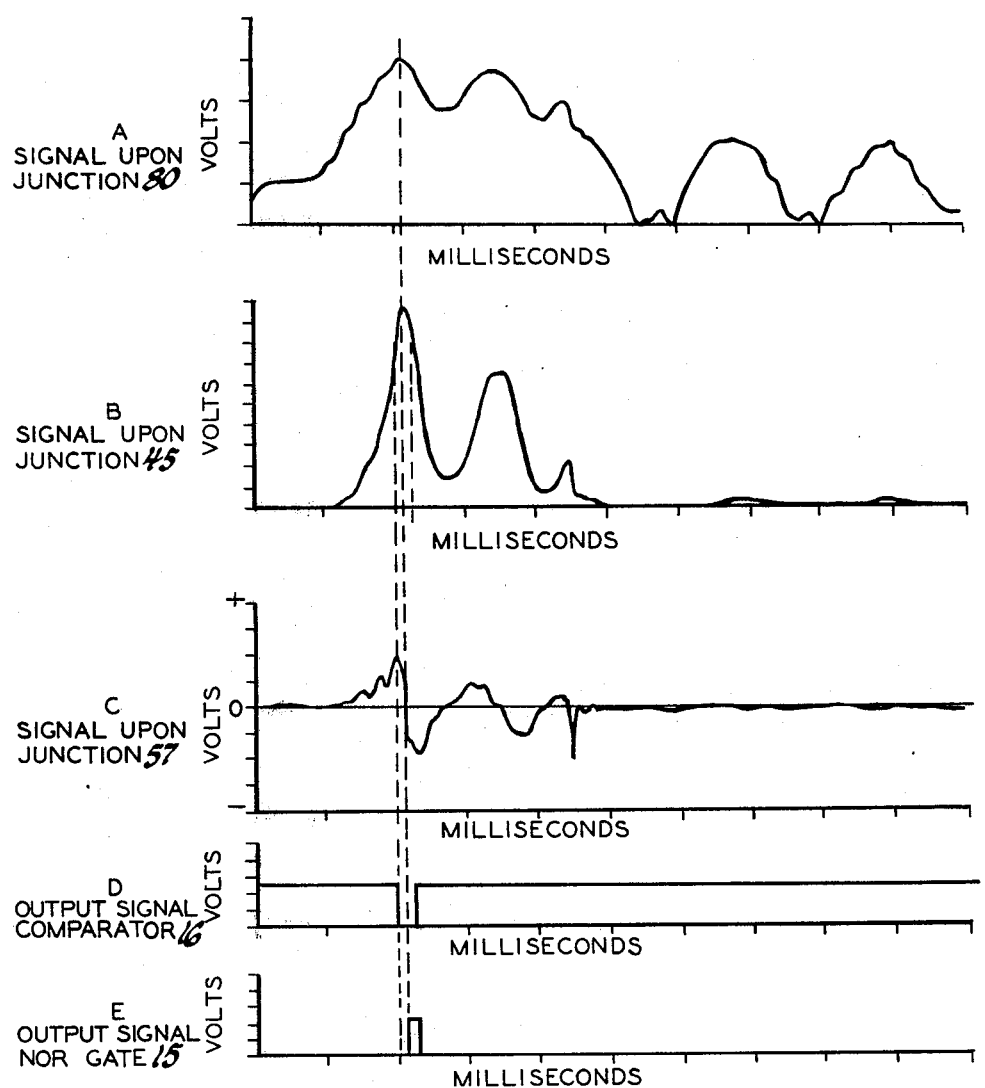

For a better understanding of the present invention, together with additional objects, advantages and features thereof, reference is made to the following description and accompanying drawing in which:

FIG. 1 schematically sets forth the diesel engine start of fuel injection detecting system of this invention; and FIG. 2 is a set of curves useful in understanding the operation of the circuit of FIG. 1.

As point of reference or ground potential is the same point electrically throughout the system, it has been illustrated in FIG. 1 of the drawing by the accepted schematic symbol and referenced by the numeral 5.

The circuit of this invention employs a conventional field effect transistor operational amplifier circuit 8 such as that marketed by RCA Corporation of Somerville, N.J., under the designation CA 3140, a conventional operational amplifier circuit 9 such as that marketed by National Semiconductor Corporation of Santa Clara, Calif., under the designation LM 301, two conventional comparator circuits 16 and 19 such as those marketed by National Semiconductor Corporation of Santa Clara, Calif., under the designation LM 2901 and a three input NOR gate 15 such as that marketed by RCA Corporation of Somerville, N.J., under the designation CD 4000.

In the interest of reducing the complexity of FIG. 1 of the drawing, operating potential connections for operational amplifier circuit 9, comparator circuits 16 and 19, inverter circuit 17 and NOR gate 15 have not been shown. It is to be specifically understood however, that all of these devices have applied thereto rated operating potential. As the unit selected for multifunction converter circuit 20 requires a positive and a negative polarity operating potential and the unit selected for operational amplifier circuit 8 preferably is provided with a positive and negative polarity operating potential, the supply potential source may be any of the many dual polarity power supplies having positive and negative polarity output terminals well known in the art. As the power supply, per se, forms no part of this invention, it is not shown in FIG. 1. In FIG. 1, the positive polarity output terminal of the supply potential source is indicated by a plus sign (+) within a circle and the negative polarity output terminal thereof is indicated by a minus sign (−) within a circle. As indicated in FIG. 1, the positive and negative polarity output terminals of the power supply are both connected to the appropriate input terminals of each field effect transistor operational amplifier circuit 8 and multifunction converter circuit 20.

In accordance with logic terminology well known in the art, throughout this specification logic signals will be referred to as being in the "High" or logic 1 state or in the "Low" or logic 0 state. For purposes of this specification and without intention or inference of a limitation thereto, the "High" or logic 1 signals will be considered to be of a positive polarity potential and the "Low" or logic 0 signals will be considered to be of zero or ground potential.

Referring to FIG. 1 of the drawing, a conventional diesel engine fuel pump 18 is connected through fuel line 21 to a conventional diesel engine fuel tank 22 and through fuel line 23 to a conventional fuel injector 24. As is well known in diesel engine art, fuel is injected into each engine cylinder by a fuel injector such as fuel injector 24 that is supplied fuel by fuel pump 18 through fuel line 23. Within the fuel injector is a valve normally seated against a valve seat by a compression spring that biases the valve in a closed position. When fuel pressure acting on the valve reaches a predetermined value, the valve is opened against the force of the compression spring and fuel is injected into the associate engine cylinder.

To produce an electrical pressure signal that varies directly in magnitude with changes of fuel line pressure between fuel pump 18 and fuel injector 24, a pressure transducer 25 is placed in communication with fuel line 23 through line 26. In an actual embodiment, pressure transducer 25 is a piezoelectric crystal type pressure transducer marketed by Kistler Instrument Corporation of Amhurst, N.Y. 14120 under the designation 601 H. The piezoelectric crystal is referenced 25a. It is to be specifically understood, however, that other pressure transducers may be employed without departing from the spirit of the invention.

The output signal of pressure transducer 25 is supplied through a resistor 30 to the "minus" (−) input terminal of field effect transistor operational amplifier circuit 8 of a charge amplifier circuit including field effect transistor operational amplifier circuit 8, capacitor 31 and resistor 32. In this circuit, capacitor 31 is a feedback capacitor having a charge thereacross that is equal and opposite to the charge on the capacitance of the piezoelectric crystal 25a of pressure transducer 25 to control the gain of this charge amplifier circuit. Resistor 32 is a direct current feedback path to maintain the direct current operating point of field effect transistor operational amplifier circuit 8 an order of magnitude lower than the direct current input impedance thereof to prevent charge amplifier circuit drift into saturation.

The output signal of this charge amplifier circuit is applied through a conventional diode 35 to the input terminal of a multifunction converter circuit 20. It is the purpose of multifunction converter circuit 20 to modify the pressure signal output of the previously described charge amplifier circuit by raising the magnitude thereof to a selected mathematical power. By raising this signal to a selected mathematical power, the peak value and inflection point characteristics thereof are enhanced. In the actual embodiment, the output pressure signal of the charge amplifier circuit is raised to the fifth power by a commercially available multifunction converter circuit that is marketed by the Burr-Brown Research Corporation of Tucson, Ariz. under the designation model 4302. With this Burr-Brown multifunction converter circuit, in the actual embodiment, the charge amplifier circuit output signal is applied to input terminal 7, the positive and negative polarity output terminals of the dual polarity power supply are connected to respective input terminals 14 and 3, point of reference or ground potential 5 is connected to input terminal 10, terminals 11 and 12 are connected together and through a potentiometer 41 to point of reference or ground potential 5, terminal 6 is connected to the movable contact 40 of potentiometer 41, terminals 1 and 13 are connected respectively through a resistor 42 and through the series combination of a resistor 43 and a variable resistor 44 to the output terminal of operational amplifier circuit 12 and output circuit terminal 2 is connected to junction 45. The positive polarity output terminal of the dual polarity power supply is also connected through a resistor 46 to input terminal 7 of multifunction converter circuit 20 for the purpose of compensating for the offset current in this input stage. Diode 35 is an isolating idode for field effect transistor operational amplifier circuit 8. The junction 50 of resistor 42 and the series combination of resistor 43 and variable resistor 44 is connected to the output terminal of operational amplifier circuit 9 and through resistors 47 and 48 and potentiometer 49 to the positive polarity output terminal of the dual polarity power supply. Variable resistor 44 is adjusted to such a point that the input voltage applied to the input terminal 7 is equal to the output voltage upon output terminal 2. A voltage level that is the mid-range for the input values of interest applied to input terminal 7 is an appropriate one to use for this adjustment. Potentiometer 41 is so adjusted that the output voltage upon output terminal 2 is the value expected for the chosen values of the input voltage upon input terminal 7 and the power to which it is desired to raise this input voltage. The function of operational amplifier circuit 9 and the associated circuitry will be explained in detail later in this specification.

The output signal of multifunction converter circuit 20 that appears upon junction 45 is applied to the "minus" (−) input terminal of comparator circuit 16 and across the series combination of capacitor 55 and resistor 56 with the junction 57 therebetween being connected to the "plus" (+) input terminal of comparator circuit 19. The "plus" (+) input terminal of comparator circuit 16 is connected to the movable contact 59 of potentiometer 60 that is connected across the positive polarity output terminal of the dual polarity power supply and point of reference or ground potential 5. Potentiometer 60 is adjusted to provide a reference potential signal upon the "plus" (+) input terminal of comparator circuit 16 of a level equal to a selected percentage of the expected maximum or peak value of the multifunction converter circuit 20 output signal upon junction 45. In the actual embodiment, this reference potential signal was adjusted to be of the order of 80% of the peak output signal of multifunction converter circuit 20. Resistor 61 is connected across the output terminal and the "plus" (+) input terminal of comparator circuit 16 to provide hysteresis. It is the purpose of comparator circuit 16 to provide a "window" based on the level of the modified pressure signal output of multifunction converter circuit 20 upon junction 45 to insure that the initial pressure peak only is detected for its inflection point.

Series capacitor 55 and resistor 56 comprise a differentiating circuit that differentiates the modified pressure signal output of multifunction converter circuit 20 that is present upon junction 45 to detect the negative rate of change of the modified electrical pressure signal at the apex of the first or initial peak. This differentiated signal is applied to the "plus" (+) input terminal of comparator circuit 19, the "minus" (−) input terminal of which is connected to the output terminal of NOR gate 15. As the output device of each of comparator circuits 16 and 19 is the uncommitted collector electrode of a grounded emitter NPN transistor, resistors 62 and 63 are pull-up resistors for respective comparator circuits 16 and 19.

The output terminal of comparator circuits 16 and 19 are connected to respective input terminals b and c of conventional three input NOR gate 15. To provide a retriggerable inhibit circuit, the series combination of resistor 71 and capacitor 72 is connected across the positive polarity output terminal of the dual polarity power supply and the output terminal of NOR gate 15 with the junction 73 therebetween being connected to a conventional inverter circuit 17. The output terminal of inverter circuit 17 is connected to input terminal a of NOR gate 15. Diode 74 connected in parallel with resistor 71 provides a discharge path for capacitor 72 as will be later explained in this specification.

Assuming that pressure transducer 25 is not producing an output signal, the output signal of comparator circuit 16 is a logic 1 that is applied to input terminal b of three input terminal NOR gate 15. With a logic 1 signal present upon any one or all of the input terminals thereof, NOR gate 15 produces a logic 0 output signal. As a consequence, capacitor 72 charges in a plus to minus direction through resistor 71 and the output device of NOR gate 15 that provides a circuit path to point of reference or ground potential 5. As a consequence, the potential upon junction 73 is of a positive polarity with respect to point of reference or ground potential 5. This positive polarity signal upon junction 73 is inverted to a logic 0 signal by inverter circuit 17 and applied to input terminal a of three input NOR gate 15.

Upon the operation of diesel engine fuel pump 18 to inject fuel into the cylinder of the diesel engine accommodated by fuel injector 24, the pressure signal produced by pressure transducer 25 begins to increase in magnitude and is applied to the previously described charge amplifier circuit. The charge amplifier circuit combines the functions of amplifying the output signal of pressure transducer 25 and effectively filtering out the high frequency components that may be present on this pressure signal as a consequence of radial resonance of the fuel line 23 to produce an output signal upon junction 80 substantially as indicated by curve A of FIG. 2. This signal increases in magnitude with fuel pressure as the fuel is compressed within fuel line 23, is raised to the fifth power by multifunction converter circuit 20 and appears upon junction 45 as a modified pressure signal as indicated by curve B of FIG. 2. This modified pressure signal upon junction 45 is applied to the "minus" (−) input terminal of comparator circuit 16 and is differentiated by capacitor 55 and resistor 56. The differentiated modified pressure signal, indicated by curve C of FIG. 2, appears upon junction 57 and is applied to the "plus" (+) input terminal of comparator circuit 19.

When the potential level of the modified pressure signal upon junction 45 increases to a level substantially equal to that of the reference potential signal appearing across movable contact 59 of potentiometer 60 and point of reference or ground potential 5 that is applied to the "plus" (+) input terminal of comparator circuit 16, comparator circuit 16 abruptly switches to the alternate condition of operation in which a logic 0 signal is present upon the output terminal thereof as indicated by curve D of FIG. 2. This logic 0 signal that is produced when the modified pressure signal upon junction 45 has reached the selected value as determined by the reference potential signal value is applied to input terminal b of NOR gate 15. As the output signal of comparator circuit 19 is a logic 1 at this time and is applied to input terminal c of NOR gate 15, the output signal of NOR gate 15 remains a logic 0 as indicated by curve E of FIG. 2.

When the pressure within fuel line 23 increases to the maximum value at which the valve within fuel injector 24 is forced open thereby to inject fuel into the corresponding engine cylinder, the pressure signal appearing upon junction 80 peaks out and begins to reduce in magnitude as illustrated by curve A of FIG. 2. This inflection point is enhanced in the modified pressure signal present upon junction 45 and appears as a sharp peak thereon as illustrated by curve B of FIG. 2. It is apparent, therefore, that the raising of the pressure signal present upon junction 80 to the fifth power to produce a modified pressure signal upon junction 45 serves to enhance the peak and inflection point characteristics of the pressure signal present upon junction 80. At the instant the rate of change of the modified pressure signal upon junction 45 occurs, the differentiated signal appearing upon junction 57 abruptly decreases in magnitude and falls through zero substantially at the point of inflection of the pressure signal present upon junction 80 as indicated by curve C of FIG. 2. The differentiator circuit comprising capacitor 55 and resistor 56, therefore, serves to detect the occurrence of the negative rate at the inflection point of the pressure signal upon junction 80 that occurs at substantially the peak value at which the valve of fuel injector 24 is opened to admit fuel into the associated engine cylinder. As this signal is applied to the "plus" (+) input terminal of comparator circuit 19, when this differentiated signal passes through zero indicating the inflection point of the pressure signal, comparator circuit 19 abruptly switches to the alternate state in which a logic 0 signal is present upon the output terminal thereof. This logic 0 signal that is produced when the inflection point of the pressure signal upon junction 80 is detected is applied to input terminal c of NOR gate 15. At this time, there is a logic 0 signal present upon each of the input terminals of NOR gate 15; consequently, this device produces a logic 1 output signal as indicated by curve E of FIG. 2.

As the pressure signal present upon junction 80 continues to decrease in value as fuel is being injected into the cylinder of the engine corresponding to fuel injector 24, the value of the modified pressure signal appearing upon junction 45 also decreases abruptly and passes through the potential level substantially equal to the reference potential signal applied to the "plus" (+) input terminal of comparator circuit 16. At this time, comparator circuit 16 abruptly switches states to the condition of operation in which a logic 1 signal is present upon the output terminal thereof as indicated by curve D of FIG. 2. This logic 1 signal is applied to input terminal b of NOR gate 15. Upon the appearance of this logic 1 signal upon input terminal b thereof, the output signal of NOR gate 15 returns to a logic 0 as indicated by curve E of FIG. 2. Therefore, NOR gate 15 produces an output signal, curve E of FIG. 2, that is indicative of start of fuel injection in response to the first electrical signal produced by comparator circuit 16 during the time that the potential level of the modified pressure signal present upon junction 45 is of a level substantially equal to and greater than that of the reference potential signal applied to the "plus" (+) input terminal thereof and to the second electrical signal produced by comparator circuit 19 when the inflection point of the pressure signal upon junction 80 is detected by a negative rate upon junction 57. As NOR gate 15 is enabled only during the presence of a logic 0 output signal of comparator circuit 16, this device produces a "window" that insures that the inflection point of the initial or first pressure signal peak.

While the start of fuel injection indicating output signal upon the output terminal of NOR gate 15 is present, capacitor 72 discharges through diode 74. When the start of fuel injection indicating output signal upon the output terminal of NOR gate 15 is terminated upon the termination of the first electrical signal produced by comparator circuit 14, the potential signal upon junction 73 is substantially ground potential. This substantially ground potential signal is inverted to a logic 1 signal by inverter circuit 17 and is applied to input terminal a of NOR gate 15 to maintain NOR gate 15 disabled. With this arrangement, false triggering of NOR gate 15 with any of the peak values of the pressure signal upon junction 80 other than the first or initial peak value is substantially eliminated. Similarly, by referencing the output terminal of NOR gate 15 to the "minus" (−) input terminal of comparator circuit 19 during the presence of the start of fuel injection indicating output signal, comparator circuit 19 is latched in the condition in which a logic 0 signal is present upon the output terminal thereof. This arrangement also prevents false triggering of NOR gate 15.

With reference to curve A of FIG. 2, the fuel pressure signal bottoms out subsequent to the inflection point of the initial pressure increase peak value when the valve within fuel injector 24 closes. The fuel pressure signal then begins to increase to a point at which the fuel injector 24 valve again opens at a second fuel pressure peak. Upon the opening of the fuel injector 24 valve, the pressure again decreases. This fuel injector 24 valve modulation continues until the valve finally closes to shut off fuel flow and the pressure signal decreases to substantially zero. The subsequent ripples in the pressure signal are a result of "water hammer" effect in the fuel line.

To maintain the modified pressure signal upon junction 45 within the limits of this circuit, an automatic gain control arrangement is provided for multifunction converter circuit 20. The modified pressure signal appearing upon junction 45 is applied through resistor 81 and diode 82 and places a charge upon capacitor 83. This charge upon capacitor 83 is applied to the "plus" (+) input terminal of operational amplifier circuit 9, the minus (−) input terminal of which is connected to the junction between series resistors 47 and 48. The charge upon capacitor 83 is amplified by operational amplifier circuit 9 and applied to the multifunction converter circuit through the parallel combination of resistor 42 and series connected potentiometer 44 and resistor 43. As the current through this series-parallel resistor network increases in magnitude, the gain of multifunction converter circuit 20 is reduced. As a consequence, the gain of multifunction converter circuit 20 is maintained within the circuit parameters. To provide a slow discharge path for capacitor 83, a resistor 84 is connected in parallel therewith. Therefore, should the modified pressure signal upon junction 45 reduce in magnitude for a selected period of time, the charge upon capacitor 83 is leaked off through resistor 84 to a lower level. This lower level of charge upon capacitor 83 results in a lower current flow through the series-parallel resistor network into multifunction converter 20 to thereby increase the gain thereof.

The diesel engine start of fuel injection detecting system of this invention is operative to produce an output signal that is indicative of start of fuel injection by utilizing the initial peak fuel pressure characteristic at the head of the fuel injector as an indication of start of fuel injection. The special signal processing techniques of filtering out the high frequency components by the previously described charge amplifier circuit and raising this signal to a mathematical power more distinctly identifies this initial peak fuel pressure characteristic for the reason that the peak and inflection point characteristics thereof are enhanced by this operation. Further, this modified pressure signal is differentiated to detect the negative rate that occurs at the point of inflection of the pressure signal upon the start of fuel injection to very accurately identify the inflection point. Further, a "window" is provided by the operation of comparator circuit 14 that is based upon a selected level of the modified pressure signal so as to provide detection of the initial fuel pressure peak only.

While a preferred embodiment of the present invention has been shown and described, it will be obvious to those skilled in the art that various modifications and substitutions may be made without departing from the spirit of the invention that is to be limited only within the scope of the appended claims.

The embodiments of the invention in which an exclusive property or privilege is claimed are defined as follows:

1. A diesel engine start of fuel injection detecting system that is sensitive to the change of fuel line pressure between the fuel pump and the injector upon the start of fuel injection, comprising:
   means for producing an electrical pressure signal that varies directly in magnitude with changes of fuel line pressure between the fuel pump and the injector;
   means for modifying said pressure signal by raising the magnitude thereof to a selected mathematical power;
   means for producing a first electrical signal when said modified pressure signal reaches a selected value;
   means for detecting the inflection point of said modified pressure signal upon the start of fuel injection and for producing a second electrical signal upon the detection thereof; and
   means responsive to said first and second electrical signals for producing an output signal that is indicative of start of fuel injection.

2. A diesel engine start of fuel injection detecting system that is sensitive to the change of fuel line pressure between the fuel pump and the injector upon the start of fuel injection, comprising:
   means for producing an electrical pressure signal that varies directly in magnitude with changes of fuel line pressure between the fuel pump and the injector;
   means for filtering out the high frequency components of said pressure signal;
   means for modifying said pressure signal by raising the magnitude thereof to a selected mathematical power;
   means for producing a first electrical signal when said modified pressure signal reaches a selected value;
   means for detecting the inflection point of said modified pressure signal upon the start of fuel injection;
   means responsive to said detection of said inflection point of said modified pressure signal for producing a second electrical signal; and
   means responsive to said first and second electrical signals for producing an output signal that is indicative of start of fuel injection.

3. A diesel engine start of fuel injection detecting system that is sensitive to the change of fuel line pressure between the fuel pump and the injector upon the start of fuel injection, comprising:
   means for producing an electrical pressure signal that varies directly in magnitude with changes of fuel line pressure between the fuel pump and the injector;

means for modifying said pressure signal by raising the magnitude thereof to a selected mathematical power;

means for producing a first electrical signal when said modified pressure signal reaches a selected value;

means for differentiating said modified pressure signal and for producing a second output signal in response to a selected change of rate thereof at the inflection point thereof upon the start of fuel injection; and means responsive to said first and second electrical signals for producing an output signal that is indicative of start of fuel injection.

4. A diesel engine start of fuel injection detecting system that is sensitive to the change of fuel line pressure between the fuel pump and the injector upon the start of fuel injection, comprising:

means for producing an electrical pressure signal that varies directly in magnitude with changes of fuel line pressure between the fuel pump and the injector;

means for filtering out the high frequency components of said pressure signal;

means for modifying said pressure signal by raising the magnitude thereof to a selected mathematical power;

means for producing a first electrical signal when said modified pressure signal reaches a selected value;

means for differentiating said modified pressure signal for producing a selected change of rate thereof at the inflection point thereof upon the start of fuel injection;

means responsive to said selected change of rate of said differentiated modified pressure signal for producing a second electrical signal; and means responsive to said first and second electrical signals for producing an output signal that is indicative of start of fuel injection.

* * * * *